(12) United States Patent
Ayyalasomayajula et al.

(10) Patent No.: US 9,224,001 B2
(45) Date of Patent: Dec. 29, 2015

(54) ACCESS CONTROL LIST FOR APPLICATIONS ON MOBILE DEVICES DURING A REMOTE CONTROL SESSION

(71) Applicant: AetherPal Inc., South Plainfield, NJ (US)

(72) Inventors: Subramanyam Ayyalasomayajula, Kendall Park, NJ (US); Ranjithkumar Palanichamy, Piscataway, NJ (US); Deepak Gonsalves, Bridgewater, NJ (US); Artun Kutchuk, La Jolla, CA (US)

(73) Assignee: AetherPal Inc., South Plainfield, NJ (US)

( * ) Notice: Subject to any disclaimer, the term of this patent is extended or adjusted under 35 U.S.C. 154(b) by 314 days.

(21) Appl. No.: 13/842,483

(22) Filed: Mar. 15, 2013

(65) Prior Publication Data
US 2013/0263287 A1 Oct. 3, 2013

Related U.S. Application Data

(60) Provisional application No. 61/617,852, filed on Mar. 30, 2012.

(51) Int. Cl.
*G06F 21/62* (2013.01)
*H04W 12/08* (2009.01)
*H04W 8/24* (2009.01)

(52) U.S. Cl.
CPC .......... *G06F 21/6218* (2013.01); *H04W 8/245* (2013.01); *H04W 12/08* (2013.01)

(58) Field of Classification Search
CPC ..... H04W 88/18; H04W 12/06; H04W 8/245; H04L 41/28; H04L 63/20; H04L 63/0272; H04L 67/18; G06F 21/6218; G06F 21/10
See application file for complete search history.

(56) References Cited

U.S. PATENT DOCUMENTS

| | | | |
|---|---|---|---|
| 5,995,829 A | 11/1999 | Broderick | |
| 5,999,521 A | 12/1999 | Thompson | |
| 6,047,071 A | 4/2000 | Shah | |
| 6,144,849 A | 11/2000 | Nodoushani et al. | |

(Continued)

FOREIGN PATENT DOCUMENTS

| EP | 1429569 | 12/2003 |
|---|---|---|
| WO | WO2005001665 | 1/2005 |

OTHER PUBLICATIONS

Anonymous, "SyncML notification initiated session", Internet Citation, XP002462105, URL:http://www.openmobilealliance.org/tech/affiliates/syncml/syncml_dm_notification_v11_20020215.pdf, (Dec. 12, 2007).

(Continued)

*Primary Examiner* — Chau Le
(74) *Attorney, Agent, or Firm* — Volpe and Koenig, P.C.

(57) ABSTRACT

A method of implementing access restrictions on mobile devices during a remote control session Network based restrictions; User controlled restrictions, or User controlled access list restrictions. A remote support technician connects to a mobile device to perform remote access to the mobile device. As part of the remote control session a policy can be pushed to the device that would have a list of applications that would need to be allowed by the user to be shared with remote technician. Alternatively no policy is pushed and the user must allow remote support technician access.

30 Claims, 10 Drawing Sheets

(56) References Cited

U.S. PATENT DOCUMENTS

| | | | |
|---|---|---|---|
| 6,148,197 A | 11/2000 | Bridges et al. | |
| 6,201,964 B1 | 3/2001 | Tung et al. | |
| 6,378,088 B1 | 4/2002 | Mongan | |
| 6,415,324 B1* | 7/2002 | Cromer | H04L 67/42 709/208 |
| 6,516,188 B1 | 2/2003 | New et al. | |
| 6,564,055 B1 | 5/2003 | Hronek | |
| 6,615,038 B1 | 9/2003 | Moles et al. | |
| 6,625,451 B1 | 9/2003 | LaMedica, Jr. et al. | |
| 6,684,359 B2 | 1/2004 | Noy | |
| 6,832,373 B2 | 12/2004 | O'Neill | |
| 6,907,546 B1 | 6/2005 | Haswell et al. | |
| 6,925,405 B2 | 8/2005 | Adir et al. | |
| 6,959,433 B1 | 10/2005 | Morales, Jr. et al. | |
| 6,970,719 B1 | 11/2005 | McConnell et al. | |
| 7,032,212 B2 | 4/2006 | Amir et al. | |
| 7,194,264 B2 | 3/2007 | Li et al. | |
| 7,286,802 B2 | 10/2007 | Beyme et al. | |
| 7,805,719 B2 | 9/2010 | O'Neill | |
| 8,434,157 B1* | 4/2013 | Wang et al. | 726/29 |
| 2002/0099944 A1* | 7/2002 | Bowlin | G06F 21/6218 713/185 |
| 2002/0143949 A1* | 10/2002 | Rajarajan et al. | 709/226 |
| 2003/0065738 A1 | 4/2003 | Yang et al. | |
| 2003/0066065 A1 | 4/2003 | Larkin | |
| 2003/0101246 A1 | 5/2003 | Lahti | |
| 2003/0156549 A1 | 8/2003 | Binder et al. | |
| 2003/0204726 A1 | 10/2003 | Kefford et al. | |
| 2004/0098715 A1 | 5/2004 | Aghera et al. | |
| 2004/0123153 A1* | 6/2004 | Wright et al. | 713/201 |
| 2005/0114694 A1* | 5/2005 | Wager et al. | 713/200 |
| 2005/0193098 A1 | 9/2005 | Khandpur et al. | |
| 2005/0227688 A1 | 10/2005 | Li et al. | |
| 2006/0015404 A1 | 1/2006 | Tran | |
| 2006/0015626 A1 | 1/2006 | Hallamaa et al. | |
| 2006/0075284 A1 | 4/2006 | Skan | |
| 2006/0080726 A1* | 4/2006 | Bodlaender et al. | 726/2 |
| 2006/0130046 A1 | 6/2006 | O'Neill | |
| 2006/0136922 A1 | 6/2006 | Zimberg et al. | |
| 2006/0248522 A1* | 11/2006 | Lakshminarayanan | G06F 8/61 717/174 |
| 2007/0005647 A1 | 1/2007 | Cugi et al. | |
| 2007/0106564 A1 | 5/2007 | Matotek et al. | |
| 2007/0248098 A1* | 10/2007 | Chen | 370/395.2 |
| 2007/0299940 A1 | 12/2007 | Gbadegesin et al. | |
| 2008/0098380 A1 | 4/2008 | Klusmeyer | |
| 2008/0109679 A1* | 5/2008 | Wright et al. | 714/37 |
| 2008/0172736 A1 | 7/2008 | Barr et al. | |
| 2008/0209193 A1 | 8/2008 | Zhang et al. | |
| 2009/0089803 A1* | 4/2009 | Biggs | 719/318 |
| 2009/0164602 A1 | 6/2009 | Kies et al. | |
| 2009/0177882 A1 | 7/2009 | Saran et al. | |
| 2009/0221307 A1 | 9/2009 | Wolak et al. | |
| 2009/0228966 A1 | 9/2009 | Parfene et al. | |
| 2010/0037088 A1* | 2/2010 | Krivopaltsev et al. | 714/4 |
| 2010/0064341 A1* | 3/2010 | Aldera | 726/1 |
| 2010/0070649 A1 | 3/2010 | Ng | |
| 2010/0138537 A1* | 6/2010 | Ye et al. | 709/225 |
| 2010/0151823 A1 | 6/2010 | Dagorn et al. | |
| 2010/0217780 A1 | 8/2010 | Erola et al. | |
| 2011/0053583 A1* | 3/2011 | Parmar et al. | 455/419 |
| 2011/0315763 A1* | 12/2011 | Hochmuth | G06F 15/16 235/380 |
| 2012/0129503 A1* | 5/2012 | Lindeman et al. | 455/414.1 |
| 2013/0054969 A1 | 2/2013 | Charles et al. | |

OTHER PUBLICATIONS

Kovacs, E. et al, "Integrating mobile agents into the mobile middleware", Internet article: http://download.springer.com/static/pdf/630/art%253A10.1007%252FBF01324936.pdf?auth66=1353975026_642152af85f26d0903f4dc786bdf1416&ext=.pdf>, p. 68-74, (Retrieved from Internet Nov. 26, 2012).

Caporuscio, M. et al, "Design and evaluation of a support service for mobile, wireless publish subscribe applications", 2003 IEEE, Internet article: http:ieeexplore.ieee.org/stamp/stamp.jsp?tp=&arnumber=1265521, 29:12, p. 1059-1071, (Retrieved from Internet Nov. 26, 2012).

* cited by examiner

ACCESS CONTROL LIST FOR APPLICATIONS ON MOBILE DEVICES DURING A REMOTE CONTROL SESSION

PRIORITY CLAIM

In accordance with 37 C.F.R. §1.76, a claim of priority is included in an application Data Sheet filed concurrently herewith. Accordingly, the present invention claims priority under 35 U.S.C. §§119(e), 120, 121, and/or 365(c) to U.S. Provisional Patent Application No. 61/617,852, entitled "ACCESS CONTROL LIST FOR APPLICATIONS ON MOBILE DEVICES DURING A REMOTE CONTROL SESSION", filed on Mar. 30, 2012. The contents of which the above referenced application is incorporated herein by reference in its entirety.

FIELD OF INVENTION

The present invention relates to mobile wireless communication devices, systems, networks, and methods of operation. This invention describes the feature of access restrictions that can be put for applications on mobile devices during a remote control session (Virtual Mobile Management (VMM)). This invention details multiple modes of setting restrictions on the applications remotely.

BACKGROUND OF THE INVENTION

During a remote control session (Virtual Mobile Management), CSR or Remote Technician would access subscriber/user mobile device to trouble shoot an issue. In this process, Remote Technician potentially would be able to access private data of the user and this is a major concern that would need to be addressed.

SUMMARY OF THE INVENTION

The current invention allows the user to have total control of the privacy of his/her applications/private data during a remote control session. During a remote control session, the remote support technician can view/access only the applications that user would allow them to access.

An advantage of this invention is the ability to protect mobile devices. Mobile devices have lot of sensitive data and applications that Users would want to protect and this invention enables the users to control the privacy on their devices while having someone access the device.

Another advantage of this invention is during a remote control session, the technician would be able to navigate thru the device without any impact to user data (User has the ability to control the view/access to the data). This would allow carriers and other tech support organizations to be able to support remote control to a mobile device without worrying about legal issues of privacy infringement.

This invention benefits the end user of a mobile device with much needed protection of their data/application privacy. User would be able to control the access to sensitive data on their mobile devices. This is also very beneficial to the carriers as they would not have to be embroiled in legal issues of accessing user sensitive data without user consent. An objective of this invention to provide platform wherein as new applications are added, the list can be dynamically modified to support them so the access is restricted.

This invention benefits the end user of a mobile device with much needed protection of their data/application privacy. User would be able to control the access to sensitive data on their mobile devices. This is also very beneficial to the carriers as they would not have to be embroiled in legal issues of accessing user sensitive data without user consent.

Other objectives and advantages of this invention will become apparent from the following description taken in conjunction with any accompanying drawings wherein are set forth, by way of illustration and example, certain embodiments of this invention. Any drawings contained herein constitute apart of this specification and include exemplary embodiments of the present invention and illustrate various objects and features thereof.

DETAILED DESCRIPTION OF THE PREFERRED EMBODIMENT

Figure 1:
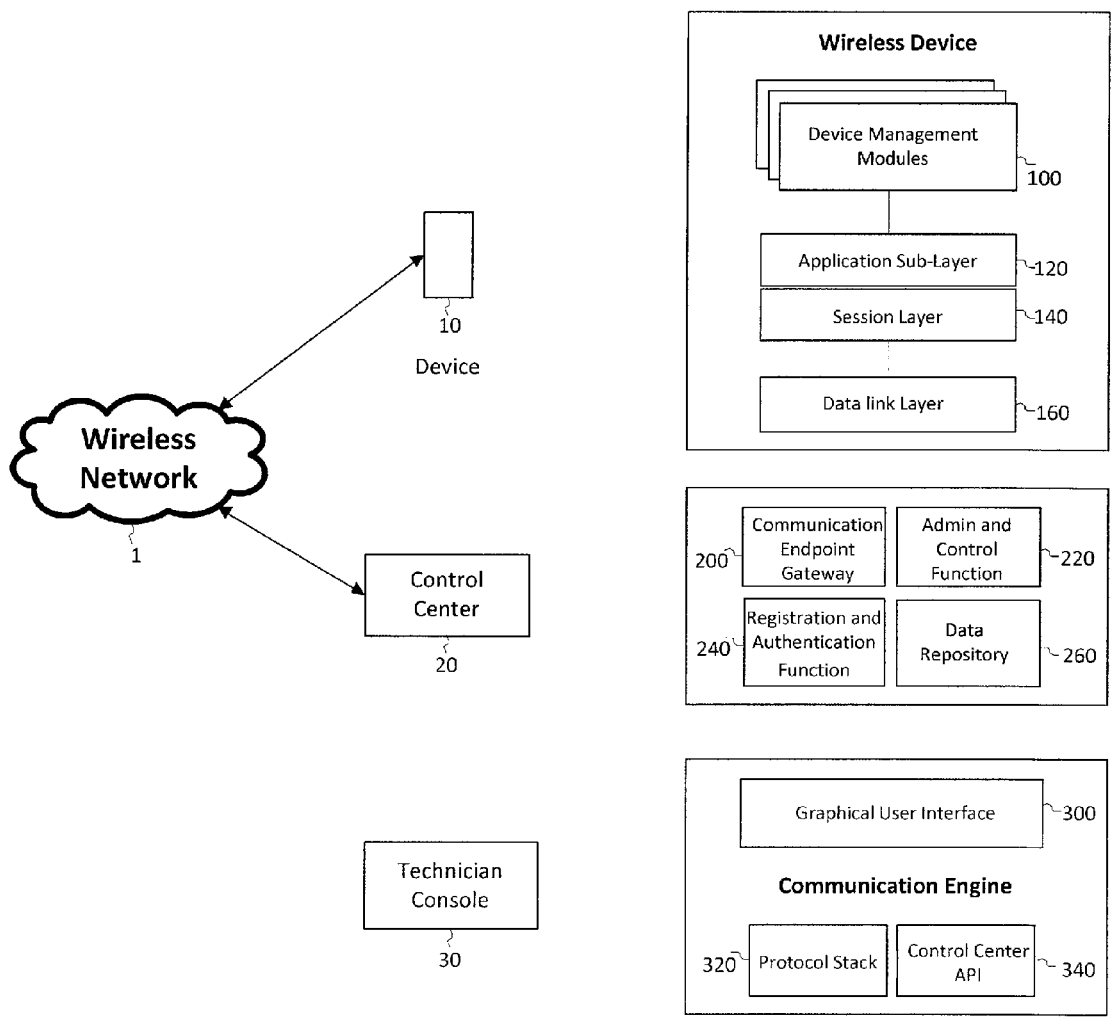
FIG. 1 illustrates the overall architecture of the Virtual Mobile Management (VMM) system.

Referring to FIG. 1, set forth is the overall architecture of the Virtual Mobile Management (VMM) system. For the purpose of readability, Blocks number starting with 1xx relates to Device [10] and it components; 2xx under refer to Control Center [20] and its components; 3xx under relate to Technician Console [30] and its components.

The Virtual Mobile Management Remote Control (VMM-RC) is a powerful tool designed to be used by the customer care representatives to remotely view and control the mobile devices. In a preferred embodiment, the key components of the VMM-RC system include: Technician Console [30] where care agents interact with the remote devices [10] through Control Center [20] services that mediate communication between the Technician Console [30] and the remote devices [10].

The Control Center [20] comprises the following elements:
Communication Endpoint Gateway or CEG [200]
Admin and Control Function or ACF [220]
Registration and Authentication Function or RAF [240]
Data Repository [260]

The primary responsibility of CEG [200] is to manage and mediate sessions. The server provides communication endpoints between device [10] and Technician Console [30]. This allows for multiple requests to be serviced within one session from multiple instances of [30]. The CEG or [200] provides a consistent manner of device connection and Tool service in a system with heterogeneous devices running different operating systems. The CEG or [200] provides load balancing across multiple Connection Handlers on each Communication End Point Gateway Server in order to minimize single point of failure.

Figure 2:
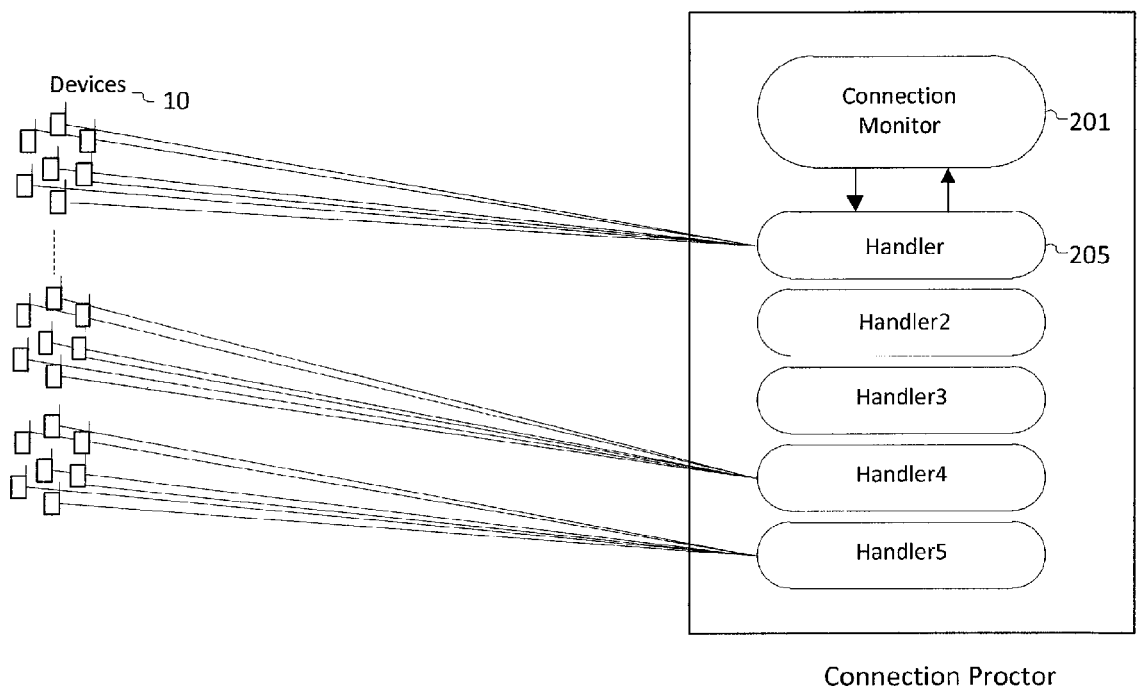
FIG. 2 illustrates the details of Communication Endpoint Gateway.

FIG. 2, shows components of CEG [200] in detail. CEG [200] is comprised of two components; the Connection Monitor [201] and the Connection Handler [205].

The primary function of [201] is: Create and manage multiple instances of [205]; Creates Session ID for new connection requests; Monitors all the scheduled and existing sessions. The primary function of [205] is: authenticate inbound connections; mediate VMM session traffic between device [10] and Technician Console [30].

Figure 3:
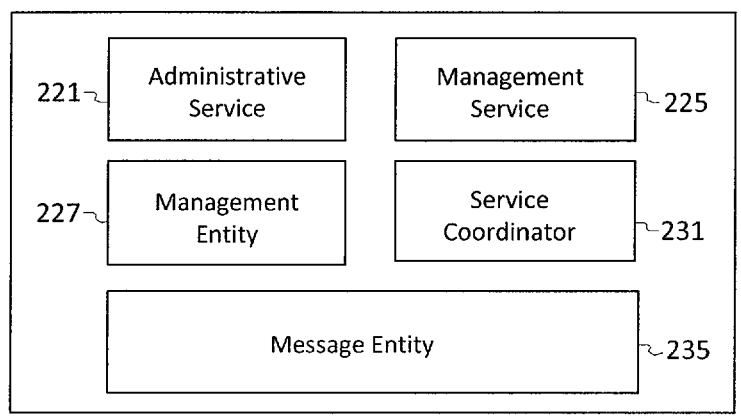
FIG. 3 illustrates the details of Admin and Control Function.

FIG. 3 shows the details of ACF [220] which is responsible in the administration, management and authorization of communication between the Control Center [20] and the devices [10]. It comprises of the following service functions:

The Administrative Service [221] is designed to be a central administrative entity of the entire virtual mobile management system. Through this service, system administrators perform administration, management and instrumentation servers within the system, create and maintain multiple tenants, assign tenant administrator roles, etc.

The Management Service [225] provides the operational endpoint to the system. The primary functions of Management Service are: Load distribution among the CEG, management of device registration; Administration of devices; Administration of users, zones, policies, roles, etc.; and Session Queuing.

The Management Entity [227] component is responsible in providing the Management service [225] with an in-memory data store for key operational data such as ACL, user/group/zone structures, etc.

The Service Coordinator [231] coordinates the communication between various elements within the System. It provides the database interface to the RAF [240] in the Control Center. All services register themselves with this service. This service is responsible for service discovery.

Figure 4:
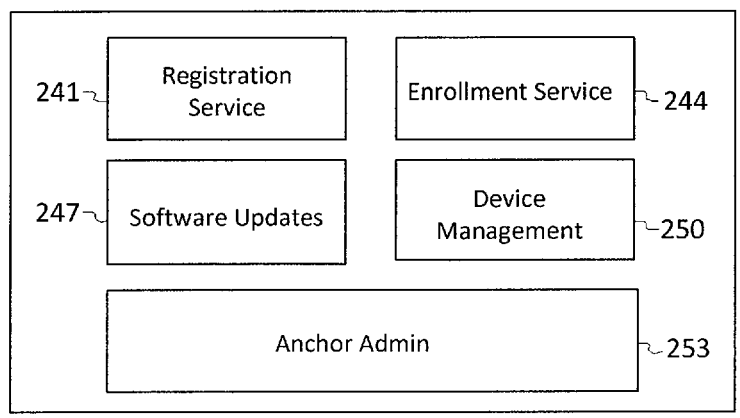
FIG. 4 illustrates the details of Routing and Authentication Function.

FIG. 4 shows the components of RAF [240] in detail; RAF [240] provides a single point of entry for all devices for enrollment and authentication services during VMM-RC session. It comprises of the following components:

Registration Service [241]: During Auto-Enrollment, devices are required to register themselves with this service, prior to enrolling themselves.

Enrollment Service [244]: This service is responsible to enroll registered devices with the system. The Enrollment process is defined in detail in the later sections of the document.

Software Updates [247]: This service manages the various client packages in the system. Devices connect to this service to request for client update. If an update is available, the service will provide the appropriate client download link.

Device Management [250]: This service provides the enrolled devices an interface to update its parameters in the system such as MDN when the device detects a change. AnchorAdmin [253]: This service provides the administration component.

Data Repository [260] is the data warehouse that stores the information about the VMM-RC Mobile devices, server configuration, tasks and status settings. These data bases are pivotal to configure and update managed devices and server components. It is also responsible to maintain the user login information as well as device authentication information.

Figure 5:
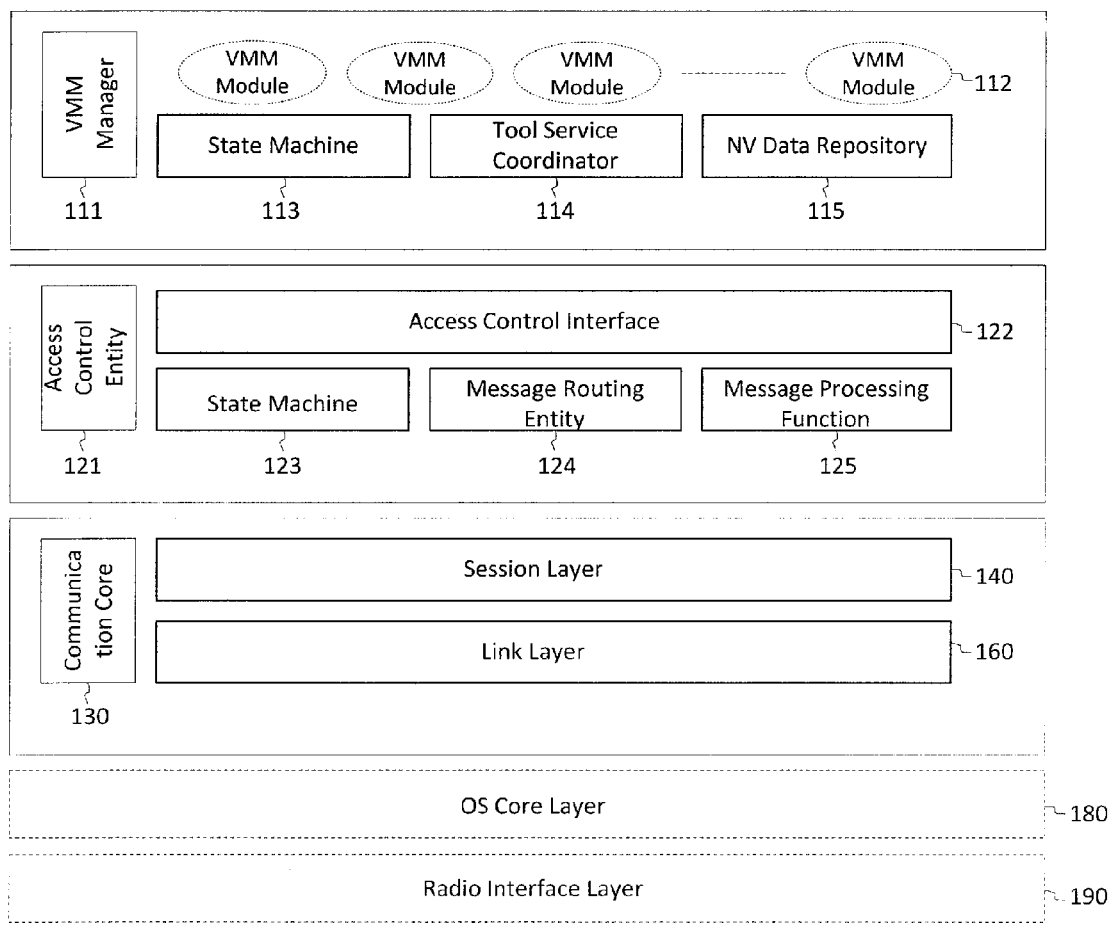
FIG. 5 illustrates the VMM client protocol architecture of Device.

FIG. 5 illustrates the VMM client protocol architecture of Device [10]. The VMM Client architecture comprises of the following protocol layers and function blocks VMM Manager [111] this layer encapsulates functional entities that provide the communication and protocol frameworks necessary to client services. This layer primarily handles bearer plane traffic. The following functional entities are part of [111].

VMM Modules [112] provide a multitude of tool services. Tool Services are grouped together that exhibit common functionality such as Remote Control, File Manager, Device Management, etc.

State Machine [113], each tool service maintains an instance of the state machine. A State Machine defines a set of shared states that the tool service on the device application shares with the server.

Tool Service Coordinator [114] maintains a collection of active tool service instances that are currently being serviced by the VMM application. This entity maintains the lifetime of all Tool Services, and is responsible in creating and destroying Tool Services.

NV Data Repository [115] authentication and authorization specific data that is shared between the VMM application and the server is maintained within the NV data repository. This data repository also serves the purpose of maintaining Tool Service configuration as well as VMM configuration data.

Access Control Entity [121] layer provides a set of functions to the Tool Services to communicate with the Control Center [20]. It provides in the encapsulation of messages before forwarding it to the Communication Core [130]. This layer is responsible to invoke an instance of the Communication Core layer and provides a state machine [123] that defines the state of the VMM application.

Access Control Interface [122] provides a set of standard Application Programmer Interface or API to the Tool Services. These APIs provide a consistent communication platform to facilitate both synchronous as well as asynchronous communication.

State Machine [123] identifies the overall state of the VMM application. State transitions within the ACE State Machine triggers events that are handled by the VMM layer. The states are Open and Closed. Traffic flows through the ACI layer only in the State Open.

Message Routing Entity [124] is responsible for routing all signal messages, destined to Tool Services to the respective event handlers.

Message Processing Function [125] is a signal message pre-processor. This entity receives signal messages from the Session Layer destined towards Tool Services. It de-frames these messages prior to forwarding it to the Message Routing Entity to apply routing rules. Messages that are destined for the server from Tool Services are encapsulated here.

Communication Core [130] Layer is responsible to set up and maintain a dedicated communication channel with the Control Center [20]. This layer provides the necessary framework to transport messages between the upper layers and the Control Center [20]. It provides message encapsulation, framing, fragmentation and packet re-construction of Tool Service messages.

Figure 6:
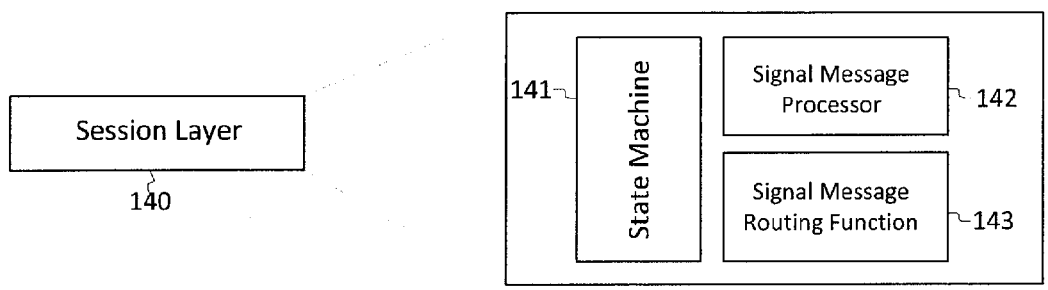
FIG. 6 illustrates the details of VMM Client Session Layer.

The communication core [130] comprises of the following sub-layers. FIG. 6 is a detail of Session Layer [140]. The session layer maintains a set of shared state between the Communication Endpoint Gateway (CEG) [200] and the VMM Application Module [112]. The session layer packets encapsulate signal messages that are transported between the CEG [200] and the VMM Module [112]. Each message within the session layer packet defines the source and destination to which the signal messages are to be delivered. The session layer consists of the following entities:

State Machine [141] maintains a state within a pre-defined set of shared state between the application and the CEG [200].

State changes within the state machine trigger the execution of state transition procedures within the VMM Application Module [112].

Signal Message Processor [142] is responsible to encapsulate and process signal messages that are transmitted between the CEG [200] and the Application Module [112]. This entity is also responsible in influencing the state transition within the state machine by altering its state. Signal messages destined to VMM modules are forwarded to the Signal Message Routing Function.

Signal Message Routing Function [143] is responsible with the task of forwarding signal messages to the appropriate destination. Signal messages destined to VMM modules are directly forwarded to the VVM Tool Service Coordinator [114]. Signal messages destined to the CEG [200] are forwarded to the link layer [160].

Referring to FIG. 5, another component is the Link Layer [160] which is responsible to establish and maintain a dedicated communication channel between the client and the CEG [200]. The Link Layer encapsulates all messages within its frame prior to forwarding it to the network. Packets that are received by the Link Layer from the network are re-constructed and de-framed prior to forwarding it to the upper layer. This layer checks for message integrity.

Figure 7:
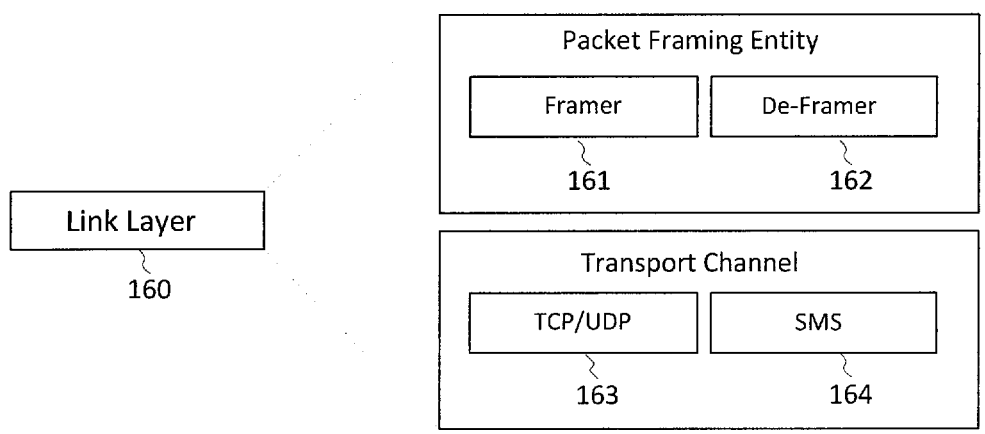
FIG. 7 illustrates the details of the VMM Client Link Layer.

The following components form the Link Layer [160] as in FIG. 7, (Detail of Link Layer in FIG. 5). The Packet Framing Entity [161,162] is responsible to encapsulate messages in Link Layer frames. These frames are then forwarded to the Transport Channel, to be forwarded to the network layer. The packet framing entity comprises of Framer [161] and the De-Framer [162]. When a network packet is received by the Packet Framing Entity, it inspects the packet and verifies the integrity of the packet. Malformed packets are silently discarded.

The Transport Channel [163,164] binds to the appropriate transport layer of the underlying operating system, which is dependent upon the VMM Tool Service. It is responsible to forward messages to the network layer and receives messages from the network layer. It provides notification to the upper layer of the state of the network layer through asynchronous events.

Figure 8:
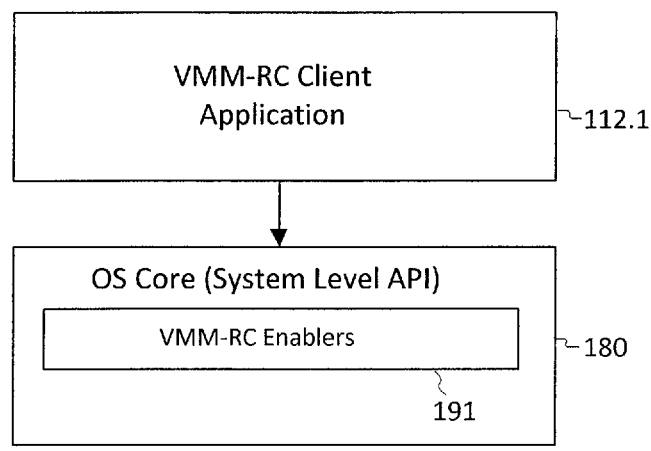
FIG. 8 is a schematic diagram of Virtual Mobile Management-Remote Control VMM-RC on Client side.

FIG. 8 shows is a schematic diagram of Virtual Mobile Management-Remote Control VMM-RC on Client side. The VMM-RC client Application [112.1] on the device provides Core Tool services, to manage the remote control session, collect the desired device diagnostics, provide self-care support for remote session activation and manage security protocol. The VMM-RC client application module [112.1] is one of the many VMM Client Application modules of [112]

The key features that are required by VMM-RC application to manage devices remotely include: Display Capture, this method involves the capturing of the device screen; Key event Injection, this method involves the injection of key events into the device screen; Touch event injection, this method involves the simulation of touch events on the device screen; and Device Information, getting the device information like network, power status, MNC, MCC, IMEI, IMSI, ESN, battery level of the smart phone etc., this is of value to the remote technician.

The VMM-RC Enabler [191] performs the key functions: Intercepts all the SMS; keeps the VMM-RC Application to its current version; if the VMM-RC Application is removed accidentally the VMM-RC Enabler shall connect to the server and download the application and installs the same.

Figure 9:
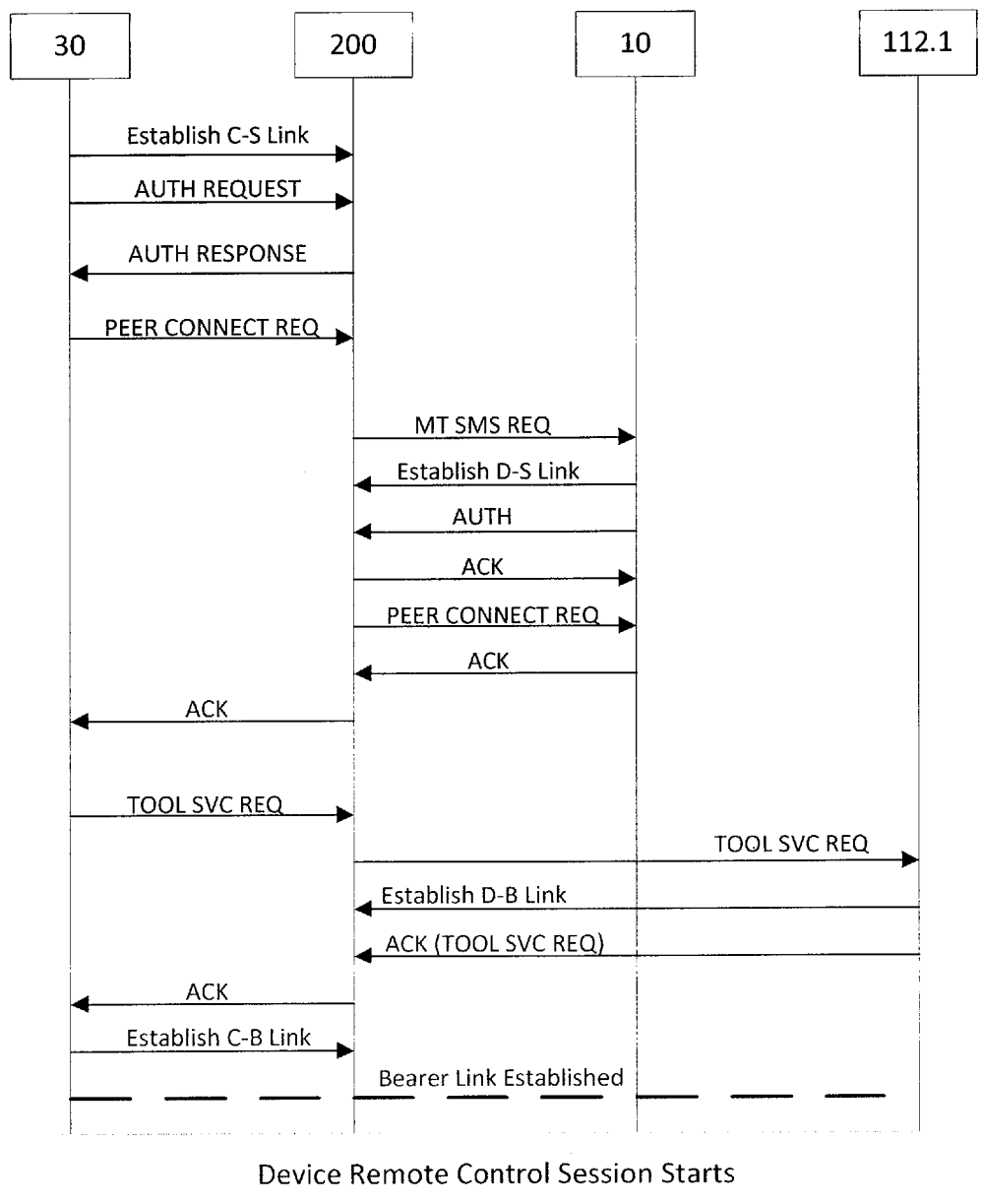
FIG. 9 illustrates the overall process of End-to-End VMM-RC Session establishment.

FIG. 9 illustrates the overall process of End-to-End VMM-RC Session establishment.

(a) CEG [200] receives C-S link connection request from Technician Console [30];

(b) Authentication Request is received by CEG [200] from the Technician Console [30];

(c) Authentication Response is sent by [200] to [30];

(d) PEER_CONNECT_REQ signal is received by [200] from [30];

(e) [200] sends a Mobile Terminated SMS to Device [10];

(f) [200] receives D-S link connection request from Device [10];

(g) Authentication Request is received by [200] from Device [10];

(h) Authentication Response is sent by [200] to Device [10];

(i) PEER_CONNECT_REQ signal sent by [200] to Device [10];

(j) ACK received by [200] from [10];

(k) ACK transmitted by [200] to Technician Console [30];

(l) TOOL_SVC_REQ received by [200] from [30];

(m) TOOL_SVC_REQ relayed by [200] to VMM_RC [112.1];

(n) [200] receives D-B link connection from [112.1];

(o) [200] receives ACK from [112.1] for the TOOL_SVC_REQ for step (m);

(p) ACK relayed by [200] to [30];

(q) [200] receives C-B link connection request from [30].

At this point, the control plane and bearer plane is/are established. VMM-RC bearer data is carried over the bearer channels (D-B and C-B)

Figure 10:
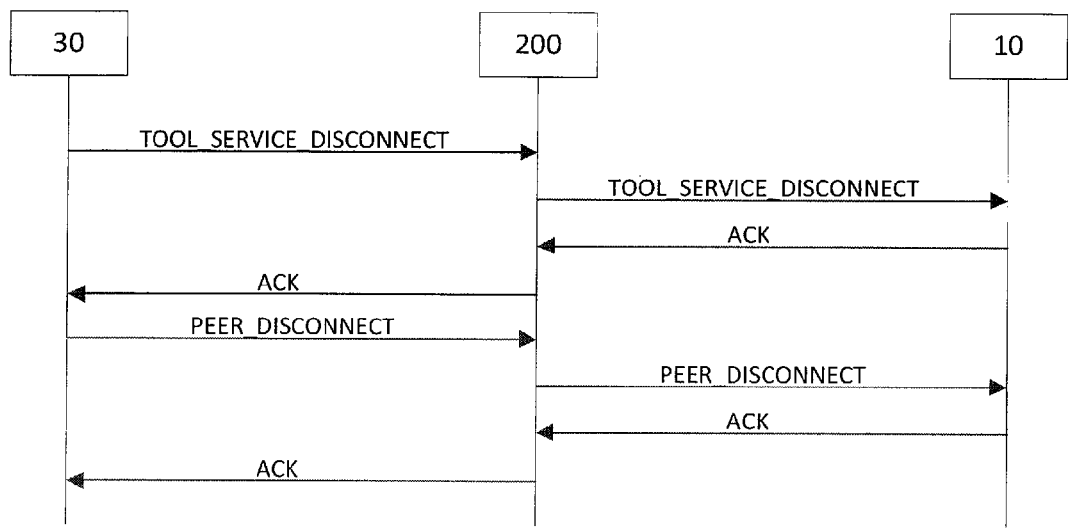
FIG. 10 illustrates the overall process of VMM-RC Session termination.

VMM-Remote Session Termination, referring to FIG. 10, the Technician, operating the Technician Console [30] initiates the VMM-RC service disconnection. The following sequence of events occurs:

(a) TOOL_SVC_DISCONNECT is received from Technician Console [30] by CEG [200];

(b) TOOL_SVC_DISCONNECT is relayed by [200] to Device [10];

(c) ACK is received by [200] from [10];

(d) ACK is relayed by [200] to Technician Console [30];

(e) PEER_DISCONNECT is received from Technician Console [30] by CEG [30];

(f) PEER_DISCONNECT is relayed by [200] to Device [10];

(g) ACK is received by [200] from [10]; and (h) ACK is relayed by [200] to Technician Console [30].

At this time, all channels are disconnected and the VMM-RC session is closed.

Referring to FIG. 9, it provides the sequence of flow during the connection between Technician console and the device. Once the authentication is complete (after Step q in FIG. 9), server sends down a CSP (Client Security Profile) that is used to determine the how the access controls are implemented. There are multiple modes the access restrictions are implemented and these are described as given below.

Figure 11:
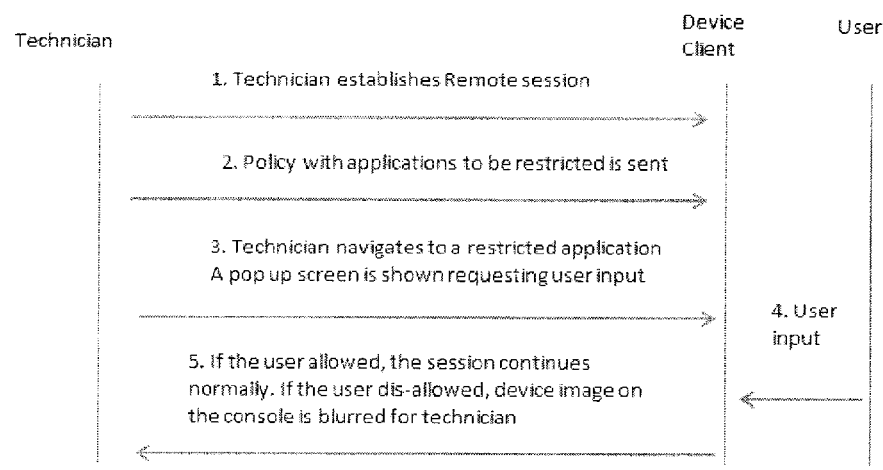
FIG. 11 is a sequence flow of events during ACL processing.

FIG. 11 refers to a sequence flow of events during ACL processing. This is the same sequence that is followed in all the subsequent use cases. The only difference would be that at times, the policy file is sent and sometimes it is not sent.

Use Case Scenario: (Network Controlled Access restrictions)

Step 1: The remote support technician connects to the mobile device to perform remote control (remote access into the mobile device);

Step 2: As part of the remote control session a policy is pushed to the device that would have a list of applications that would need to be allowed by the user to be shared with remote technician;

Step 3: During the remote session, if there is a need to access an application and that is in the list of restricted applications in the policy, client compares the application to be accessed with the names in the policy list and then a message is shown to get user consent to allow the technician to view the application;

Step 4: if the user disallows, the streaming is paused and a bearer message sent to the console that would trigger the console to show a blurred image of the device till the user moves away from the application;

Step 5: if the user allows, the application is accessible and can be viewed by the technician on the console.

Use Case Scenario: (User Controlled);

Step 1: The remote support technician connects to the mobile device to perform remote control (remote access into the mobile device);

Step 2: No policies are sent from the console to the device;

Step 3: During the remote session, as the technician tries access to either of touch/gesture, keypad, display, a pop up gets displayed that will let the user allow the technician to access the applications based on these three features;

Step 4: if the user disallows, the technician would not be able to access the application that would need to use any of these three features (gesture/touch, keypad, display);

Step 5: if the user allows, the remote session continues normally.

Use Case Scenario: (User Controlled Access List)

Step 1: The remote support technician connects to the mobile device to perform remote control (remote access into the mobile device);

Step 2: No policies are sent from the console to the device. Default, on the mobile device, all the applications are blacklisted (Technician cannot access);

Step 3: During the remote session, if there is a need for the technician to access a particular application, a pop up comes with a request to grant access. User would need to take action to allow or disallow the technician;

Step 4: if the user disallows, the technician would not be able to access the application;

Step 5: if the user allows, the remote session continues normally;

There are other alternative use cases that can be derived from a combination of these three main use cases and this application intends to cover them also.

Use Case Scenario: (Combination of Network and User Controlled Access List)

Step 1: The remote support technician connects to the mobile device to perform remote control (remote access into the mobile device);

Step 2: Policy is pushed from the console to the device. Default, on the mobile device, all the applications are blacklisted (Technician cannot access);

Step 3: During the remote session, if there is a need for the technician to access a particular application, a pop up comes with a request to grant access. Based on the combination of user controlled and Network pushed policy, user would need to take action to allow or disallow the technician;

Step 4: if the user disallows, the technician would not be able to access the application; and Step 5: if the user allows, the remote session continues normally.

Use Case Scenario: (Variation of User Controlled Access List, where User would Allow/Disallow Access at a More Granular Level)

Step 1: The remote support technician connects to the mobile device to perform remote control (remote access into the mobile device);

Step 2: No policy is pushed from the console to the device. Default, on the mobile device, all the applications are blacklisted (Technician cannot access);

Step 3: During the remote session, if there is a need for the technician to access a particular application, a pop up comes with a request to grant access. User has the ability to provide access to an application based on the granularity of the access (access can be provided to the settings but not to the data of the application) and user would need to take action to allow or disallow the technician;

Step 4: if the user disallows, the technician would not be able to access the application;

Step 5: if the user allows, the remote session continues normally.

Use Case Scenario: (Variation of User Controlled Access List, where Certain Sensitive Information (Like Location) are ALWAYS Restricted by Default Whether or not the Application Itself is Restricted)

Step 1: The remote support technician connects to the mobile device to perform remote control (remote access into the mobile device);

Step 2: No policy is pushed from the console to the device. Default, on the mobile device, all the applications are blacklisted (Technician cannot access);

Step 3: During the remote session, if there is a need for the technician to access a particular application, a pop up comes with a request to grant access. User has the ability to provide access to an application based on the granularity of the access (access can be provided to the settings but not to the data of the application) and user would need to take action to allow or dis-allow the technician;

Step 4: if the user disallows, the technician would not be able to access the application;

Step 5: if the user allows, the remote session continues, however, if the application uses any of the pre-identified sensitive services (like location), a pop up comes with a request to grant access.

Other Extensions: Restrictions (both Network and User controlled) could be extended based on role/group. Restrictions (both Network and User controlled) could be extended to a more granular level based on device model/OS/Software version.

It is to be understood that while a certain form of the invention is illustrated, it is not to be limited to the specific form of arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments. Indeed, various modifications of the described modes for carrying out the invention which are obvious to those skilled in the art are intended to be within the scope of the following claims.

What is claimed is:

1. A method of implementing access restrictions on a mobile device during a remote management session, the method comprising:
   establishing a remote management session between a console and a mobile device;
   providing an access control policy to the mobile device;
   attempting, by the console, to access an application on the mobile device;
   receiving at the console an access control violation notification on a condition that a violation is detected, wherein a user of the mobile device determines the access control violation; and
   perceiving a pre-defined image of the mobile device at the console upon disapproval by the user of the mobile device of an access attempt of the application.

2. The method according to claim 1, further comprising:
   perceiving paused streaming on the mobile device at the console upon disapproval by a user of the mobile device of an access attempt of the application.

3. The method according to claim 1, further comprising: waiting for a grant request from the user of the mobile device on a condition that the application uses pre-identified sensitive information.

4. The method according to claim 3, wherein the pre-identified sensitive information is location information.

5. The method according to claim 1, wherein the application is on a list of restricted applications.

6. The method according to claim 5, wherein a restriction is based on a group.

7. The method according to claim 5, wherein a restriction is based on a role.

8. The method according to claim 5, wherein a restriction is based on at least one of a mobile device model, an operating system and a software version.

9. The method according to claim 1, wherein the access control policy allows a predefined level of access to the application.

10. The method according to claim 9, wherein the predefined level of access permits access to settings.

11. The method according to claim 9, wherein the predefined level of access disallows access to data.

12. The method according to claim 1, wherein certain information is permanently restricted.

13. The method according to claim 1, wherein the remote management session is initiated by the user of the mobile device.

14. The method according to claim 1, wherein the remote management session is remote technician console initiated.

15. The method according to claim 1, wherein the access control policy is at least one of a network control policy and a user control policy.

16. The method according to claim 1, wherein the access control policy includes at least one of a blacklist, and user allowed access list.

17. The method according to claim 1, wherein when a remote support technician seeks access, the user of the mobile device gets a notification that permits the user of the mobile device to allow the remote support technician to access the application.

18. A system for implementing access restrictions on a mobile device during a remote management session, comprising:
   a remote technician console configured to establish a remote management session with a mobile device;
   the remote technician console configured to attempt access to an application on the mobile device;
   the remote technician console configured to receive an access control violation notification on a condition that violation is detected based on an access control policy, wherein a user of the mobile device determines the access control violation; and
   the remote technician console configured to perceive a pre-defined image of the mobile device upon disapproval by the user of the mobile device of an access attempt of the application.

19. The system according to claim 18, further comprising:
   the remote technician console configured to transmit the access control policy to the mobile device.

20. The system according to claim 18, wherein the access control policy is a user control policy.

21. The system according to claim 18, further comprising:
   the remote technician console configured to perceive paused streaming on the mobile device upon disapproval by a user of the mobile device of an access attempt of the application.

22. The system according to claim 18, wherein the access control policy allows a predefined level of access to the application.

23. The system according to claim 22, wherein the predefined level of access permits access to settings and disallows access to data.

24. The system according to claim 18, further comprising:
   the remote technician console configured to request user approval from the user of the mobile device on a condition that the application uses pre-identified sensitive information.

25. The system according to claim 18, wherein certain information is permanently restricted.

26. The system according to claim 18, wherein the remote management session is initiated by the user of the mobile device.

27. The system according to claim 18, wherein the remote management session is remote technician console initiated.

28. The system according to claim 18, wherein the access control policy includes at least one of a blacklist, and user allowed access list.

29. The system according to claim 18, wherein when a remote support technician seeks access, the user of the mobile device gets a notification that permits the user of the mobile device to allow the remote support technician to access the application.

30. A method of implementing access restrictions on a mobile device during a remote management session, the method comprising:
   establishing a remote management session between a console and a mobile device;
   providing an access control policy to the mobile device;
   determining access to an application on the mobile device based on the access control policy, wherein an access attempt is by the console;
   transmitting an access control violation notification on a condition that a violation is detected based on the access control policy, wherein a user of the mobile device determines the access control violation; and
   perceiving a pre-defined image of the mobile device at the console upon disapproval by the user of the mobile device of an access attempt of the application.

* * * * *